United States Patent
Deng et al.

(10) Patent No.: US 7,505,206 B2
(45) Date of Patent: Mar. 17, 2009

(54) MICROLENS STRUCTURE FOR IMPROVED CMOS IMAGE SENSOR SENSITIVITY

(75) Inventors: Jack Deng, Miaoli County (TW);
Chih-Kung Chang, Hsin-Chu (TW);
Chin Chen Kuo, Taipei (TW);
Ming-Chang Kao, Taipei County (TW);
Fu-Tien Weng, Hsinchu County (TW);
Bii-Junq Chang, Hsin-Chu (TW)

(73) Assignee: Taiwan Semiconductor Manufacturing Company, Hsin-Chu (TW)

( * ) Notice: Subject to any disclaimer, the term of this patent is extended or adjusted under 35 U.S.C. 154(b) by 99 days.

(21) Appl. No.: 11/456,249

(22) Filed: Jul. 10, 2006

(65) Prior Publication Data
US 2008/0007839 A1    Jan. 10, 2008

(51) Int. Cl.
*G02B 27/10* (2006.01)
(52) U.S. Cl. ....................... 359/619; 359/626
(58) Field of Classification Search ......... 359/618–620, 359/626; 348/207, 273–275
See application file for complete search history.

(56) References Cited

U.S. PATENT DOCUMENTS 5,550,626 A    8/1996  Kobayashi et al.
7,068,432 B2 *  6/2006  Boettiger et al. ............ 359/619

* cited by examiner

*Primary Examiner*—William C Choi
(74) *Attorney, Agent, or Firm*—Haynes and Boone, LLP

(57) ABSTRACT

A method of manufacturing a microlens device by depositing a microlens material layer over a substrate that includes photo-sensors. The microlens material layer is then exposed and developed to define microlens material elements, including first microlens material elements and second microlens material elements. Each second microlens material element is substantially greater in thickness relative to each first microlens material element. The microlens material elements are then heated to form a microlens array that includes first microlens array elements, each corresponding to a first microlens material element, and second microlens array elements, each corresponding to a second microlens material element. Each first microlens array element has a substantially greater focal length relative to each second microlens array element. For example, each second microlens array element is substantially greater in thickness relative to each first microlens array element.

10 Claims, 13 Drawing Sheets

US 7,505,206 B2

MICROLENS STRUCTURE FOR IMPROVED CMOS IMAGE SENSOR SENSITIVITY

BACKGROUND

Microlens arrays are widely employed in image sensor technology, such as charged coupling device (CCD) image sensors and complimentary metal-oxide-semiconductor (CMOS) image sensors. In general, CCD, CMOS, and other types of microlens arrays transform a light pattern (i.e., an image) into an electric charge pattern.

Microlens arrays are often formed by patterning a polymer layer formed over a color filter or array, a dielectric layer, and/or other substrate features. A subsequent reflow process and/or other heating method is then performed to heat the patterned polymer, thereby creating the required shape of each microlens. Each microlens is aligned over a corresponding photo-sensor formed in the underlying substrate. Consequently, light that is incident on each microlens is focused towards a corresponding photo-sensor.

A color filter may also be positioned between the microlens array and the underlying photo-sensor array, such that incident light focused by each microlens passes through the color filter prior to reaching a corresponding photo-sensor. Accordingly, specific wavelengths or wavelength ranges may be selectively blocked/permitted from reaching one or more of the photo-sensors. The color filter may be one or more substantially continuous layers that each substantially span the entire microlens array in a lateral direction (parallel to the substrate). Alternatively, the color filter may be segmented or otherwise subdivided into a plurality of filters each configured to block/permit different wavelengths. For example, such a filter array may include filters that only transmit red light, other filters that only transmit green light, and other filters that only transmit blue light.

However, when propagating in the same medium, blue light is more refractive than green light and red light, because the wavelength of blue light is about 430 nm, whereas the wavelengths for green and red lights are 550 nm and 600 nm, respectively. Consequently, once light passes through the color filter array, the resulting blue, green and red light will refract in different amounts along the propagation path leading towards the photo-sensor array. This can result in the one or more of the different wavelengths not being accurately focused on the photo-sensors, possibly decreasing the accuracy and reliability of the microlens-photo-sensor device.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
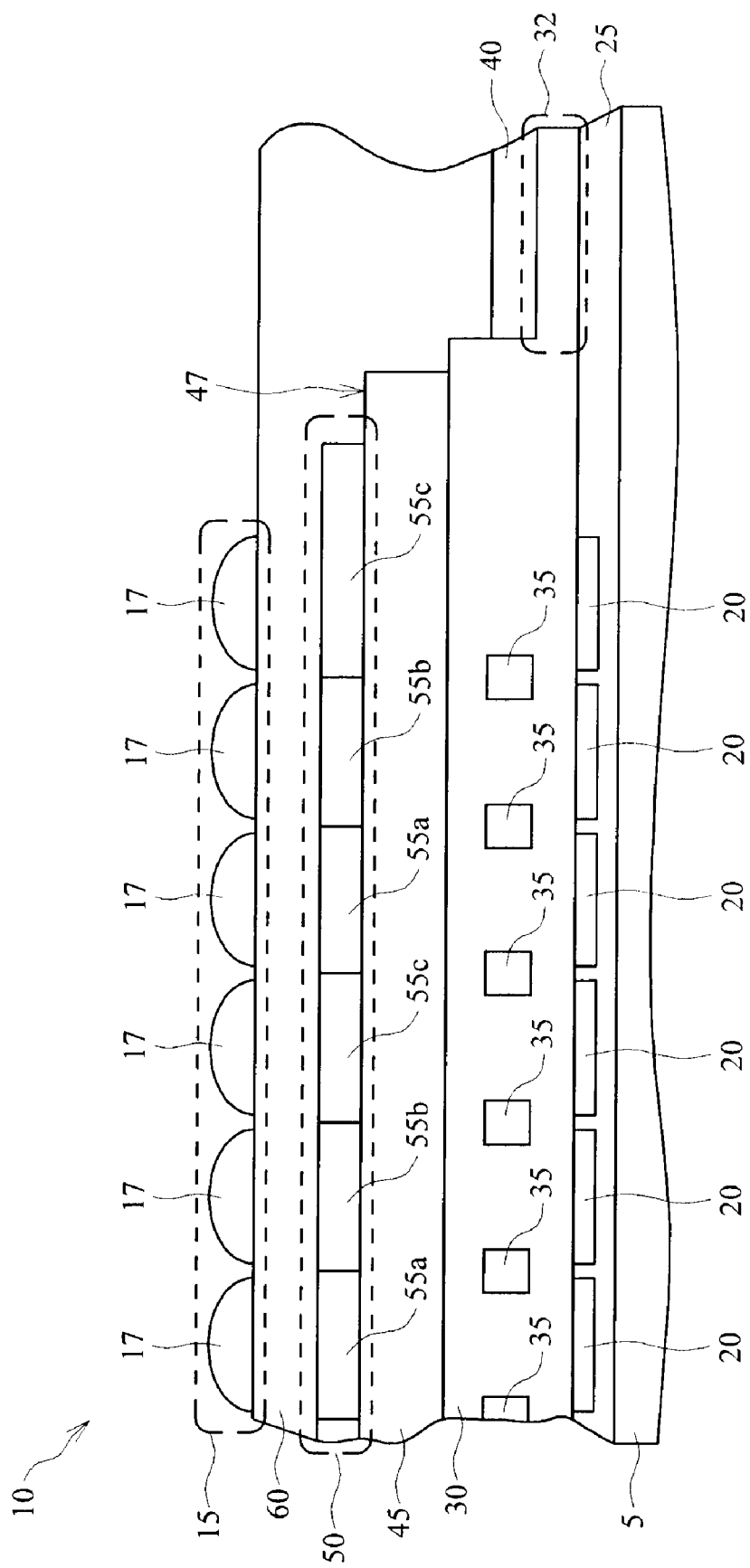
FIG. 1 is a sectional view of at least a portion of a microlens-photo-sensor device according to one or more aspects of the prior art.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

Referring to FIG. 1, illustrated is a sectional view of at least a portion of apparatus 10 according to one or more aspects of the prior art. The apparatus 10 may be or include a microlens-photo-sensor device. For example, the apparatus 10 includes a microlens array 15, which includes a plurality of microlenses 17 that are each vertically or otherwise optically aligned with a corresponding one of a plurality of photo-sensors 20. The photo-sensors 20 may include photodiodes and/or other sensors diffused or otherwise formed in the substrate 5.

Aspects of the present disclosure are applicable and/or readily adaptable to microlens arrays employing charged coupling device (CCD) and complimentary metal-oxide-semiconductor (CMOS) image sensor applications (e.g., active-pixel sensors), among others. As such, the photo-sensors 20 may comprise conventional and/or future-developed image sensing devices.

The apparatus 10 may include or be at least temporarily formed on or from a substrate 5, as well as a plurality of layers formed on the substrate 5. For example, in the exemplary embodiment depicted in FIG. 1, a dielectric layer 25 formed on the substrate 5 electrically isolates each photo-sensor 20 from neighboring photo-sensors 20 (at least in a lateral direction relative to the substrate 5).

The substrate 5 may comprise an elementary semiconductor (such as crystal silicon, polycrystalline silicon, amorphous silicon and germanium), a compound semiconductor (such as silicon carbide and gallium arsenide), an alloy semiconductor (such as silicon germanium, gallium arsenide phosphide, aluminum indium arsenide, aluminum gallium arsenide and gallium indium phosphide), combinations thereof, and/or other materials. The substrate 5 may also comprise a semiconductor material on an insulator, such as a silicon-on-insulator (SOI) substrate, a silicon on sapphire (SOS) substrate, or a thin film transistor (TFT) layer over glass and/or other materials.

The dielectric layer 25 may comprise silicon nitride (e.g., $Si_3N_4$), silicon oxynitride (e.g., $Si_xN_yO_z$), silicon oxide, silicon dioxide, and/or other materials. The dielectric layer 25 may be substantially optically transparent, and may be formed by chemical vapor deposition (CVD), plasma enhanced CVD (PECVD), physical vapor deposition (PVD), atomic layer deposition (ALD), evaporation, spin-on coating, and/or other processes. In one embodiment, the dielectric layer 25 has a thickness ranging between about 1 µm and about 50 µm, although other thicknesses are also within the scope of the present disclosure.

Another dielectric layer 30 is formed on the dielectric layer 25 and the photo-sensors 20. The dielectric layer 30, as with other layers and/or other features of the apparatus 10, may include more than one layer, including multiple layers differing in composition and/or manufacture. The dielectric layer 30 may comprise silicon nitride (e.g., $Si_3N_4$), silicon oxynitride (e.g., $Si_xN_yO_z$), silicon oxide, silicon dioxide, and/or other materials. The dielectric layer 30 may also be a low-k dielectric layer having a dielectric constant less than or equal to about 3.9. The dielectric layer 30 may be formed by CVD, PECVD, PVD, ALD, evaporation, spin-on coating, and/or other processes. In one embodiment, the dielectric layer 30 has a thickness ranging between about 0.2 µm and about 50 µm, although other thicknesses are also within the scope of the present disclosure.

The dielectric layer 30 may include a plurality of optical stops 35 or similar structure defining a plurality of apertures each corresponding to the desired light propagation path from a corresponding microlens cell 17. For example, the stops 35 may substantially eliminate or decrease the amount of light that is incident upon a particular photo-sensor 20 from any microlens cell 17 that does not correspond to the particular photo-sensor 20. That is, each stop 35 and/or similar structure may substantially limit exposure of the particular photo-sensor 20 to the light propagating from the microlens cell 17 that is vertically aligned or otherwise corresponding to the photo-sensor 20.

As also shown in the exemplary embodiment of FIG. 1, a portion 32 of the dielectric layer 30 may be recessed relative to a thicker portion of the dielectric layer 30. The apparatus 10 may include a contact, land, and/or other electrical interconnection feature 40 positioned with the recessed portion 32 of the dielectric layer 30.

The apparatus 10 may also include a planar layer 45 located over at least a portion of the dielectric layer 20. The planar layer 45 has a substantially planar upper surface 47 on which a color filter 50 is formed. The composition of the planar layer 45 may include conductive and/or dielectric materials. For example, the planar layer 45 may comprise silicon oxide and/or silicon nitride, among other materials. The planar layer 45 may also have at least some degree of optical transparency, including where the planar layer 45 is substantially optically transparent, among other embodiments. The planarity of the planar layer 45 may be achieved by chemical-mechanical planarizing ("CMP," also referred to as chemical-mechanical polishing). However, other planarizing methods may alternatively or additionally employed to render surface 47 as substantially planar, such as thermal flow, resist etchback, sacrificial resist etchback, spin-on, and/or others. In one embodiment, for example, the planar layer 45 includes one or more layers that partially or substantially comprise a resin or polymeric material, such as a negative photoresist based on an acrylic polymer.

The color filter 50 is configured to absorb, deflect, and/or otherwise prevent the transmission of certain colors of incident light, thereby preventing such light from reaching the photo-sensors 20. For example, the color filter 50 may allow only light of one particular wavelength to pass. However, as in the embodiment depicted in FIG. 1, the color filter 50 may be an array of color filter elements each allowing light of one of several wavelengths to pass. For example, the color filter array 50 shown in FIG. 1 may include color filters 55a that pass only red light, color filters 55b that pass only green light, and color filters 55c that pass only blue light. Alternatively, the color filters 55a may pass only cyan light, the color filters 55b may pass only magenta light, and the color filters 55c may pass only yellow light. However, the color filter array 50 may not be limited to such red-green-blue (RGB) and cyan-magenta-yellow (CMY) configurations. For example, other embodiments of the color filter may be configured to pass other combinations of wavelengths and/or other numbers of wavelengths (e.g, fewer or greater than the three different wavelength filter elements shown in FIG. 1).

The composition and manufacture of the color filter array 50 may be selected to suit the particular process technologies employed elsewhere in the manufacture of the device 10. For example, such compositions and manufacturing processes may include those employed for volume production using 0.8 µm, 0.6 µm, 0.5 µm, 0.35 µm, 0.30 µm, 0.25 µm, 0.22 µm, 0.18 µm, 0.15 µm, 0.13 µm, 193 nm, 90 nm, 80 nm, 65 nm, 45 nm, and/or other process technologies, including those currently offered or projected by Taiwan Semiconductor Manufacturing Co. Ltd., among others. In one embodiment, the color filter array 50 comprises a negative photoresist based on an acrylic polymer including color pigments. The composition and/or manufacture of the color filter array 50 may be selected to achieve a desired pixilation, possibly depending on the ultimate end-use of the device 10. For example, the device 10 may ultimately be employed in digital cameras, where the color filter array 50 may be suitable to achieve several million pixels.

The device 10 may also include a spacer layer 60, such as may be employed to adjust the distance between the overlying microlens array 15 and the underlying photo-sensors 20. For example, the spacer layer 60 may have a thickness ranging between about 0.2 µm and about 50 µm, although other thicknesses of the spacer layer 60 are also possible, as well as embodiments in which the spacer layer 60 is omitted. The spacer layer 60 may also have a composition that is substantially similar to that of the planar layer 45, such as a composition that is substantially optically transparent, and may be formed by one or more processes similar to those employed to form the planar layer 45.

The substrate 5, photo-sensors 20, dielectric layers 25 and 30, aperture-defining features 35, interconnection feature 40, planar layer 45, color filter 50, spacer layer 60, and microlens array 15 are conventional with regard to composition and/or manufacture. For example, where such elements substantially comprise silicon dioxide, they may be formed by spin-on, ion implantation of oxygen, sputtering, thermal oxidation, atomic layer deposition (ALD), plasma-enhanced chemical vapor deposition (PECVD), low-pressure chemical vapor deposition (LPCVD), and/or high-density plasma (HDP-CVD), among other processes. Tetraethoxysilane (TEOS), for example, may be employed to form such a silicon dioxide element via PECVD. Additional examples include where such elements substantially comprise silicon nitride, in which case they may be formed by ion implantation of nitrogen, sputtering, ALD, PECVD, LPCVD, and/or HDP-CVD, among other processes. Hexachlorodisilane (HCD) and ammonia ($NH_3$), for example, may be employed to form such a silicon nitride element via LPCVD. Of course, other compositions and manufacturing processes may also be employed to form one or more of these elements.

In the depicted embodiment, the microlens array 15 is formed on the spacer layer 60 by first coating the spacer layer 60 with a microlens material. For example, the microlens material may include a resin or polymeric material, such as a negative photoresist based on an acrylic polymer. The microlens material is then exposed and developed by conventional photolithography processes, thereby defining a plurality of discrete microlens material elements each partially or substantially resembling a polyhedron. A reflow process and/or other heating method is then employed to form the convex profile of each microlens 17. Consequently, each microlens 17 has substantially the same cross-sectional profile (shown in FIG. 1) relative to each other microlens 17. For example, each microlens 17 in the microlens array 15 extends to substantially the same height over the spacer layer (or in a direction that is normal to the surface 47 of the planar layer 45), and each microlens 17 in the microlens array 15 has substantially the same curvature.

Figure 2:
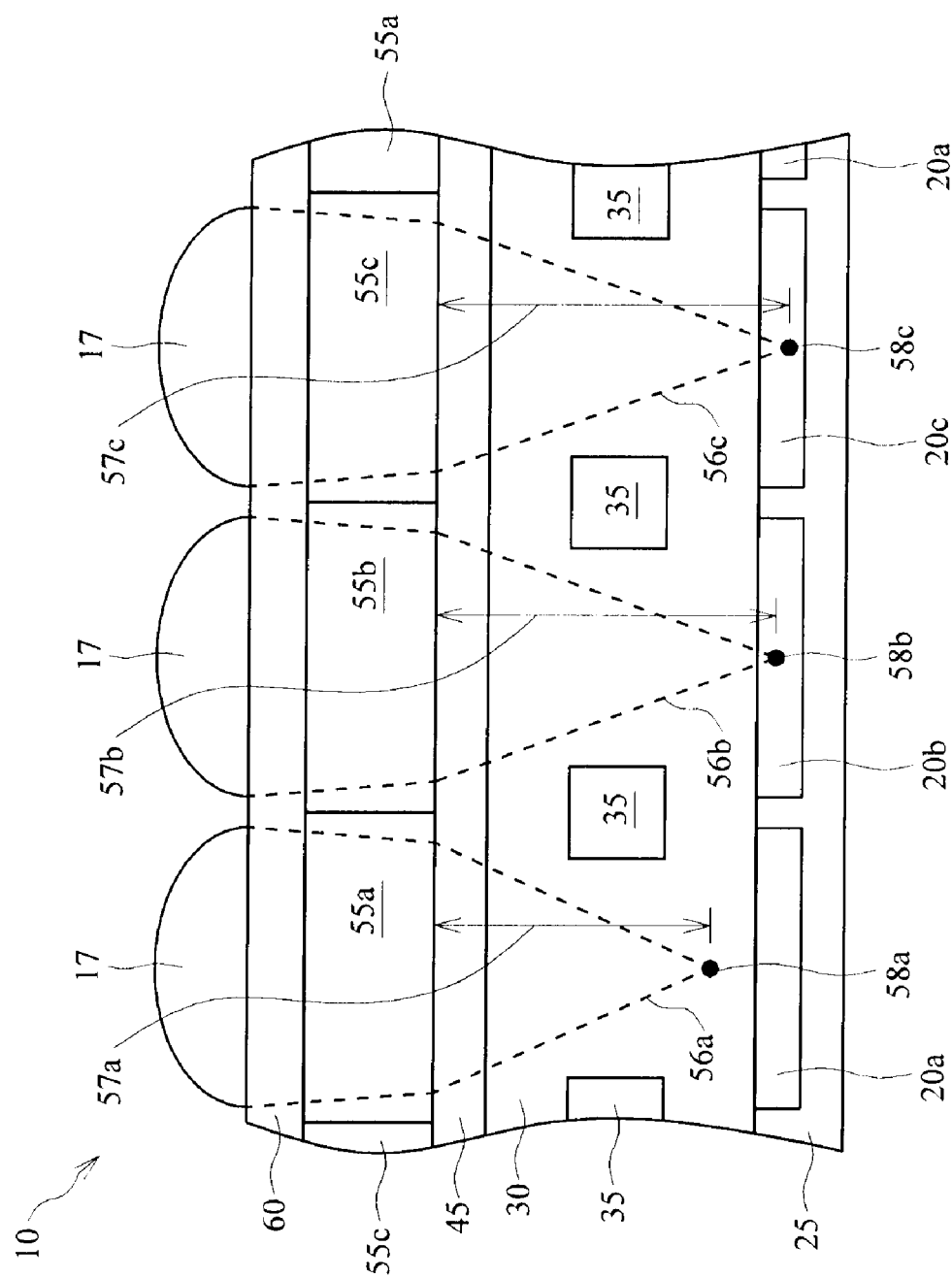
FIG. 2 is a magnified view of a portion of the device shown in FIG. 1.

Referring to FIG. 2, illustrated is a magnified view of a portion of the device 10 shown in FIG. 1. A result of the above-described manufacturing process conventionally employed to form the microlens array 15 is that the microlens cells 17 have different focal lengths due to the variation of refractive indices of the different color filter elements 55a-c.

For example, the embodiment depicted in FIG. 2 includes a color filter element 55a configured to focus only blue light 56a onto photo-sensor 20a, a color filter element 55b configured to focus only green light 56b onto photo-sensor 20b, and a color filter element 55c configured to focus only red light onto photo-sensor 20c. However, the different colored light 56a-c propagates through portions of the planar layer 45 and the dielectric layer 30 that have the same thickness and refractive index. Consequently, because the wavelength of the blue light 56a is about 20% less than the wavelength of the green light 56b and about 30% less than the wavelength of the red light 56c when propagating through the same medium, the blue light 56a is more refractive than the green light 56b and the red light 56c when propagating through the planar layer 45 and the dielectric layer 30. Thus, the blue light 56a has a shorter focal length 57a relative to the focal length 57b of the green light 56b and the focal length 57c of the red light 56c.

As a result, aspects of the microlens array 15 may be selected or configured such that the median of the three focal lengths 57a-c, which is focal length 57b in this example, results in a focal point 58b that is substantially coincident with its photo-sensor 20b. Additionally, the wavelengths of the green light 56b and the red light 56c differ by less than about 10%, such that the refraction of the red light 56c is substantially similar to the refraction of the green light 56b. Thus, the focal point 58c of the red light 56c is also substantially coincident with its photo-sensor 20c. However, because the refraction of the blue light 56a is substantially greater than the refraction of the green light 56b, the focal point 58a of the blue light 56a may not be coincident with its photo-sensor 20a, as depicted in FIG. 2.

Figure 3:
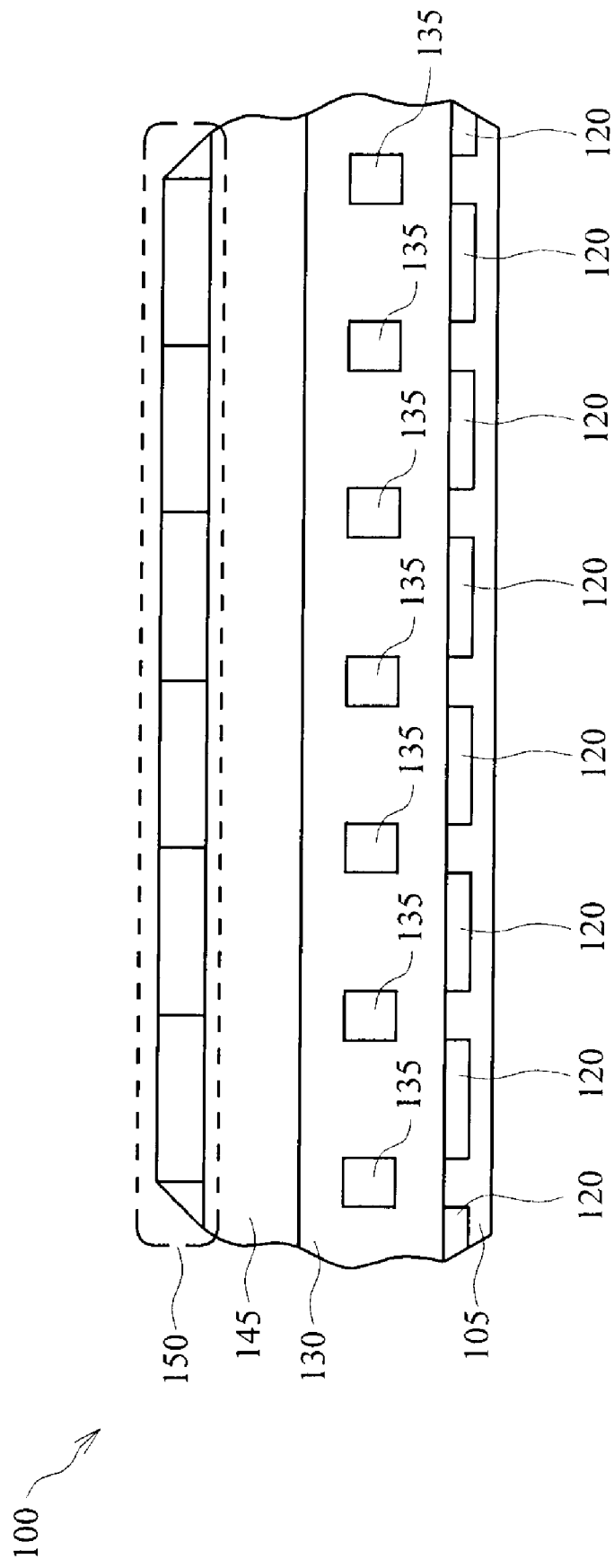
FIG. 3 is a sectional view of at least a portion of an embodiment of apparatus in an intermediate stage of manufacture according to one or more aspects of the present disclosure.

Referring to FIG. 3, illustrated is a sectional view of at least a portion of an embodiment of apparatus 100 in an intermediate stage of manufacture according to one or more aspects of the present disclosure. The apparatus 100 may be substantially similar to the apparatus 10 shown in FIG. 1 and/or FIG. 2, except as provided below.

The apparatus 100 includes a substrate 105 that is substantially similar to one or more of the substrate 5, the dielectric layer 25, and the photo-sensors 20 shown in FIG. 1. For example, the substrate 105 may include elements such as the substrate 5 and/or the dielectric layer 25 shown in FIG. 1. The substrate 105 or other portion of the apparatus 100 also includes an array of photo-sensors 120 which are substantially similar to the sensors 20 shown in FIG. 1. The apparatus 100 also includes a dielectric layer 130 that is formed over the substrate 105 and which may be substantially similar to the dielectric layer 30 shown in FIG. 1. The apparatus 100 also includes optical alignment features 135 that are embedded in the dielectric layer 130 and which may be substantially similar to the features 35 shown in FIG. 1. The apparatus 100 also includes a planar layer 145 that is formed over the dielectric layer 130 and which may be substantially similar to the dielectric layer 30 shown in FIG. 1. The apparatus 100 also includes a color filter array 150 that is formed over the planar layer 145 and which may be substantially similar to the color filter array 50 shown in FIG. 1.

Figure 4:
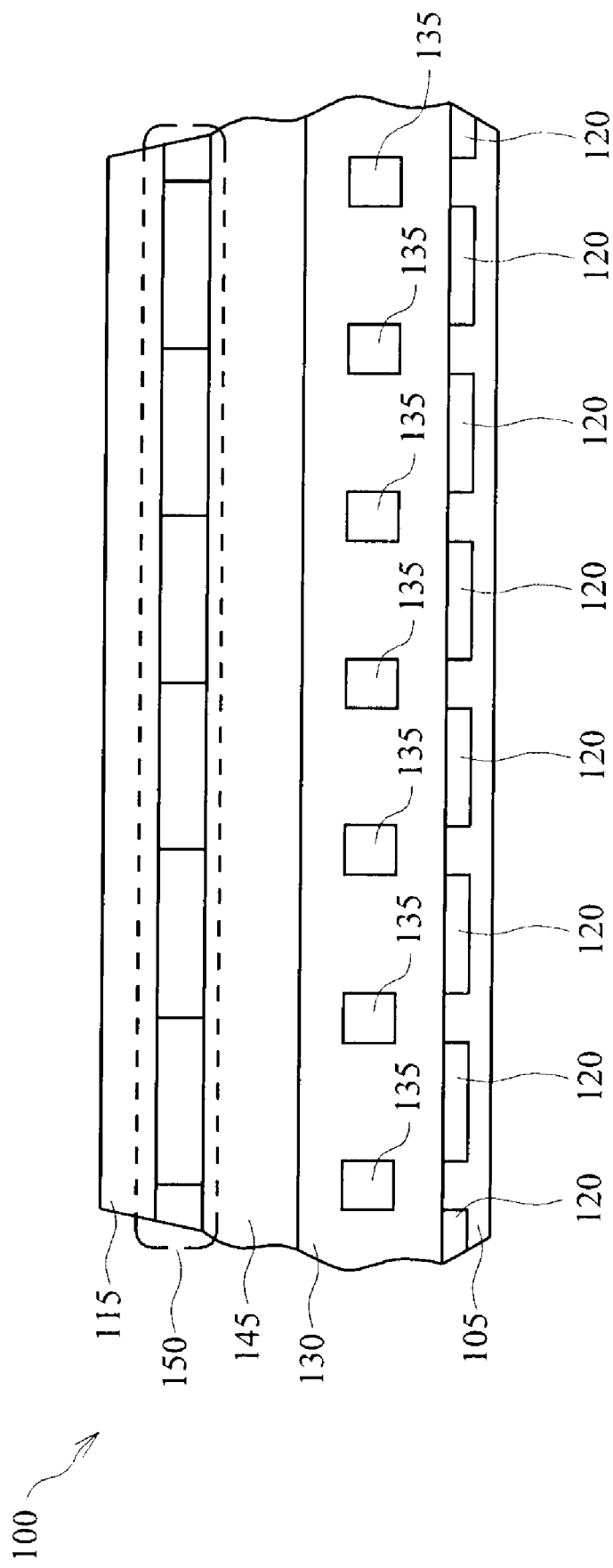
FIG. 4 is a sectional view of the apparatus shown in FIG. 3 in a subsequent stage of manufacture according to one or more aspects of the present disclosure.

Referring to FIG. 4, illustrated is a sectional view of the apparatus 100 shown in FIG. 3 in a subsequent stage of manufacture according to one or more aspects of the present disclosure, in which a microlens material 115 has been formed over the color filter array 150. The microlens material 115 may be formed directly on the color filter array 150. However, in other embodiments, one or more other layers may be formed on the color filter array 150 prior to forming the microlens material 115. For example, prior to forming the microlens material 115 over the color filter array 150, a spacer layer may be formed over the color filter array 150, such as a layer that is substantially similar to the spacer layer 60 shown in FIG. 1.

The microlens material 115 may comprise silicon nitride, a resin, or a polymeric material, such as a negative photoresist based on an acrylic polymer. The microlens material 115 may be formed over the color filter array 150 by one or more of spin-on processing, sputtering, photoresist coating processes, ALD, PECVD, LPCVD, and/or HDP-CVD, among other processes. In one embodiment, the composition and/or formation of the microlens material 115 over the color filter array 150 are substantially similar to the composition and/or formation of the microlens material employed to form the microlens cells 117 shown in FIG. 1.

Figure 5:
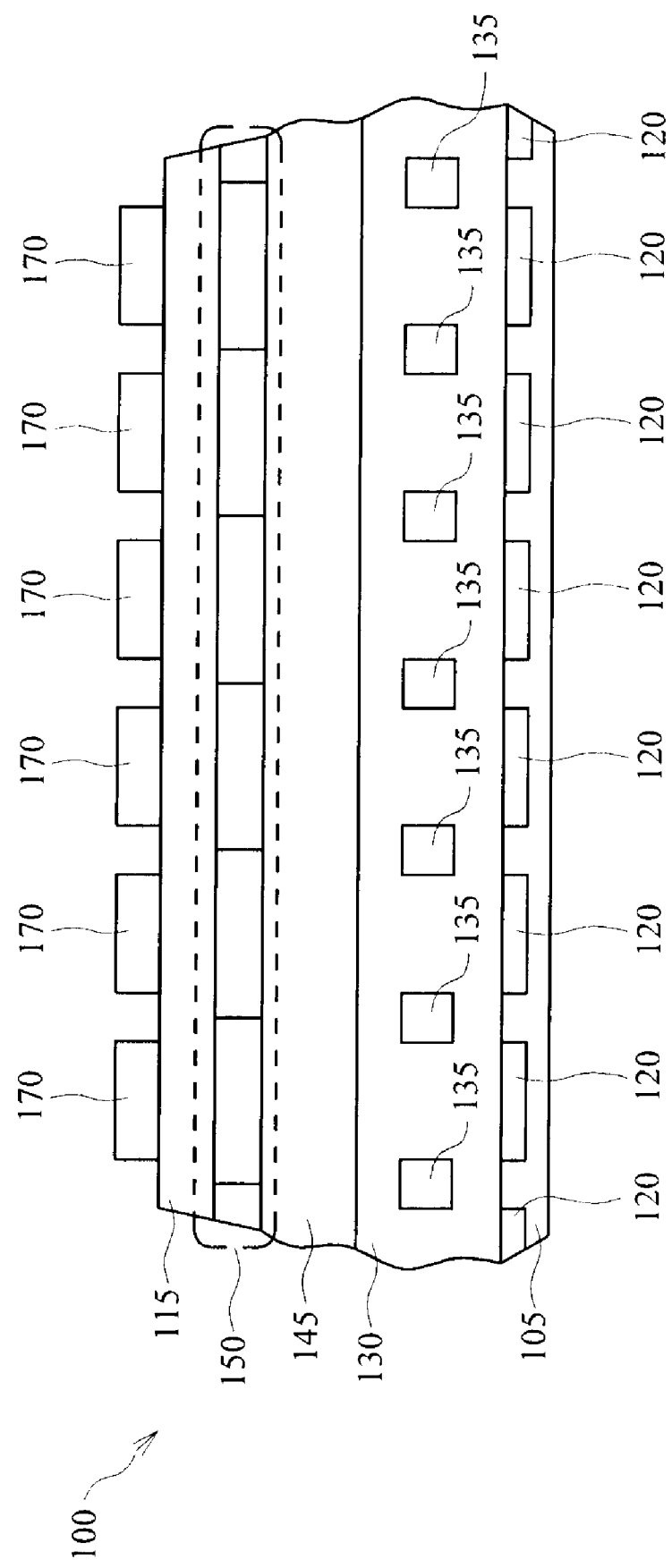
FIG. 5 is a sectional view of the apparatus shown in FIG. 4 in a subsequent stage of manufacture according to one or more aspects of the present disclosure.

Referring to FIG. 5, illustrated is a sectional view of the apparatus 100 shown in FIG. 4 in a subsequent stage of manufacture according to one or more aspects of the present disclosure, in which patterned photoresist elements 170 are formed over the microlens material 115. The photoresist 170 may be conventional with regard to its composition and its deposition over the microlens material 115, as well as with regard to its patterning. In one embodiment, the patterned photoresist 170 is formed by coating a positive or negative photoresist material over the microlens material 115 and subsequently performing one or more exposure processes and one or more development processes to define the desired pattern. The pattern of the photoresist 170 may be substantially similar to the desired pattern of the microlens cells to be formed from the microlens material 115, although the degree of such similarity may vary among different embodiments within the scope of the present disclosure.

Figure 6:
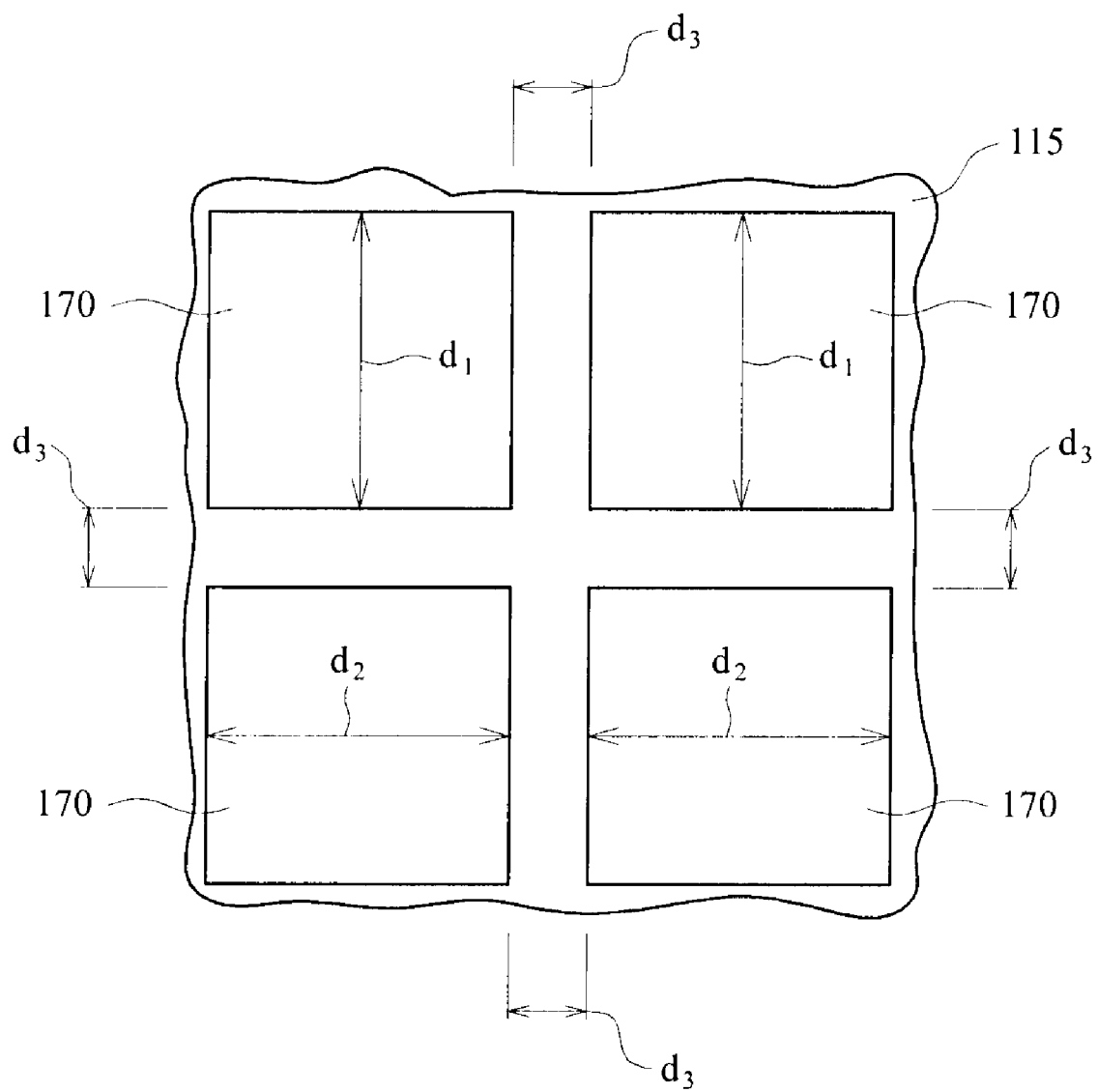
FIG. 6 is a top view of at least a portion of an embodiment of apparatus according to one or more aspects of the present disclosure.

Referring to FIG. 6, illustrated is a top view of a portion of the apparatus 100 in the manufacture stage shown in FIG. 5, depicting several of the patterned photoresist elements 170. Each patterned photoresist element 170 may be substantially identical. For example, each patterned photoresist element 170 may have a substantially square footprint, such that its lateral dimensions $d_1$ and $d_2$ are substantially equal, as depicted in FIG. 6. Moreover, each patterned photoresist element 170 may be substantially parallel to each neighboring element 170, and/or may be laterally offset from each neighboring element 170 by the same dimension $d_3$, both of which being depicted in FIG. 6. However, other shapes and orientations of the patterned photoresist elements 170 are also within the scope of the present disclosure.

After the patterned photoresist elements 170 are formed, such as in the embodiment shown in FIG. 6, the microlens material layer 115 may undergo an initial exposure step. During such exposure, the photoresist elements 170 are employed as a mask, thereby preventing exposure of portions of the microlens material 115 corresponding to the photoresist elements 170 (e.g., those portions which are substantially underneath the photoresist elements 170 and, thus, substantially shielded from the exposure energy by the photoresist elements 170). Thereafter, the patterned photoresist elements 170 may be stripped by etching or otherwise removed, leaving the partially exposed and undeveloped microlens material layer 115.

Figure 7:
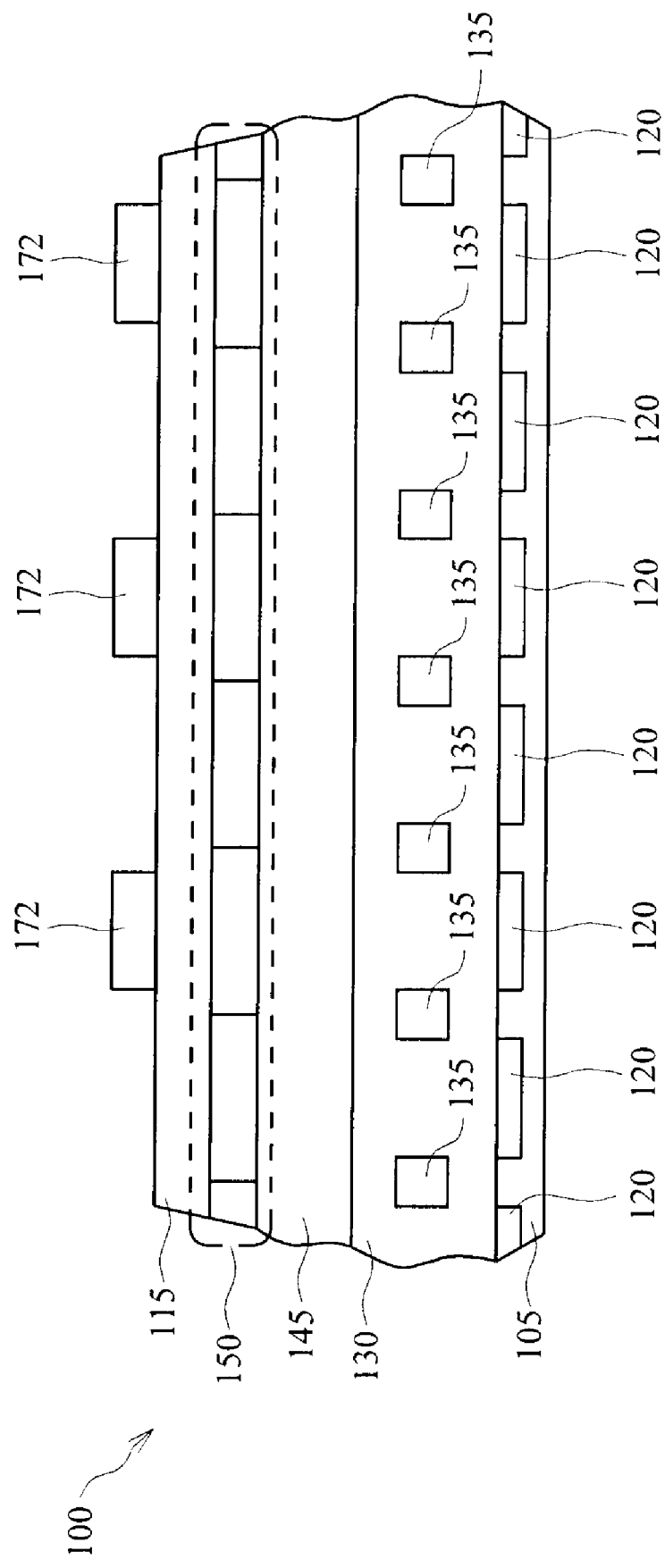
FIG. 7 is a sectional view of the apparatus shown in FIG. 5 in a subsequent stage of manufacture according to one or more aspects of the present disclosure.

Referring to FIG. 7, illustrated is a sectional view of the apparatus 100 shown in FIG. 5 in a subsequent stage of manufacture according to one or more aspects of the present disclosure, in which patterned photoresist elements 172 are formed over the partially exposed and undeveloped microlens material 115. The microlens material layer 115 may then undergo an additional exposure step to further expose those portions which correspond to pixels associated with shorter wavelengths and/or greater refraction between the color filter array 150 and the photo-sensors of the substrate 105.

The patterned photoresist elements 172 may be substantially similar to the patterned photoresist elements 170 shown in FIGS. 5 and 6. However, the number of patterned photoresist elements 172 formed on the microlens material 115 may be substantially less than the number of patterned photoresist elements 170 employed during the initial photolithographic exposure of the microlens material 115, described above with respect to FIGS. 5 and 6.

For example, where the apparatus 100 is intended to include a three-color pixilation scheme, the number of patterned photoresist elements 172 may be about 33% less than the number of patterned photoresist elements 170. However, in some embodiments, the total number of pixels may not be evenly divided between the different colors of the pixels. For example, in an RGB pixilation scheme, the number of green pixels and/or red pixels may be double or otherwise substantially greater than the number of blue pixels. In such embodiments, the number of photoresist elements 172 may vary from the number of photoresist elements 170 by greater than or less than the 33% variation described above.

According to one embodiment, the number of photoresist elements 172 differs from the number of photoresist elements 170 by that number which, if all pixels were identical except for their color filter, equals the number of pixels that would have an insufficient focal length, such as the number of blue pixels in the RGB scheme described above with respect to FIGS. 1 and 2. For example, in an RGB pixilation scheme, the number of photoresist elements 172 may be about equal to "X−Y" where "X" is the total number of pixels and "Y" is the total number of pixels of a specific color which require double photolithographic exposure to achieve an acceptable focal length.

Put another way, if the Red:Green:Blue pixel ratio is 5:4:3, such that there are five red pixels for every four green pixels and every three blue pixels, then the number of photoresist elements 172 may be about 75%, substantially complying with the 9:12 ratio of the number of red and green pixels, collectively, to the number of all pixels (red, green and blue pixels). Of course, the numbers used in this numerical example is hypothetical, devised merely to demonstrate how the quantity of photoresist elements 172 relates to the quantity of photoresist elements 170. That is, the actual Red:Green:Blue pixel ratio may be about 1:1:1, 2:1:1, 1:2:1, or 2:2:1, among others. Thus, the ratio of the number of photoresist elements 172 to the number of photoresist elements 170 may be about 2:3, 3:4, or 4:5, among others.

In view of the above, it should be apparent to those skilled in the relevant art that the intended locations of the photoresist elements 172 substantially conform to the locations of pixels which have sufficient focal lengths when undergoing only one photolithographic exposure step or otherwise formed in a conventional manner. Consequently, the portions of the microlens material 115 that were protected during the initial photolithographic exposure step that employed the photoresist elements 170 but that are not protected by the photoresist elements 172 during the second photolithographic exposure step, such as those portions corresponding to blue pixels in a Red:Green:Blue pixilation scheme, will be exposed to the photolithographic exposure energy during the second photolithographic exposure step. However, the second photolithographic exposure step is less effective than the first photolithographic exposure step.

For example, the first photolithographic step is configured such that the exposed portions of the microlens material 115 (those not protected by the photoresist elements 170) substantially span the thickness of the microlens material layer 115, whereas the second photolithographic step is configured such that the additionally exposed portions of the microlens material 115 (those not protected by the photoresist elements 172) only extend a portion into the thickness of the microlens material layer 115. In another embodiment, the effectiveness of both photolithographic steps may be substantially equal with respect to the depth to which the resulting exposed portions extend into the microlens material layer 115. That is, the first exposure step may expose about half the thickness of the microlens material 115 not protected by the photoresist elements 170, and the second exposure step may expose the remaining thickness of these portions of the microlens material 115 while also exposing only a portion of the thickness of the portions of the microlens material 115 which were previously protected by the photoresist elements 170.

In either scenario, and others within the scope of the present disclosure, the depth to which the portions of the microlens material 115 is exposed during the second exposure step (those portions previously protected by the photoresist elements 170 but not protected by the photoresist elements 172 during the second exposure step) may vary depending upon the particular embodiment. For example, the second exposure step may expose about 50% of the thickness of the portions of the microlens material 115 that are exposed for the first time during the second exposure step. However, this value may range between about 20% and about 80% within the scope of the present disclosure.

Figure 8:
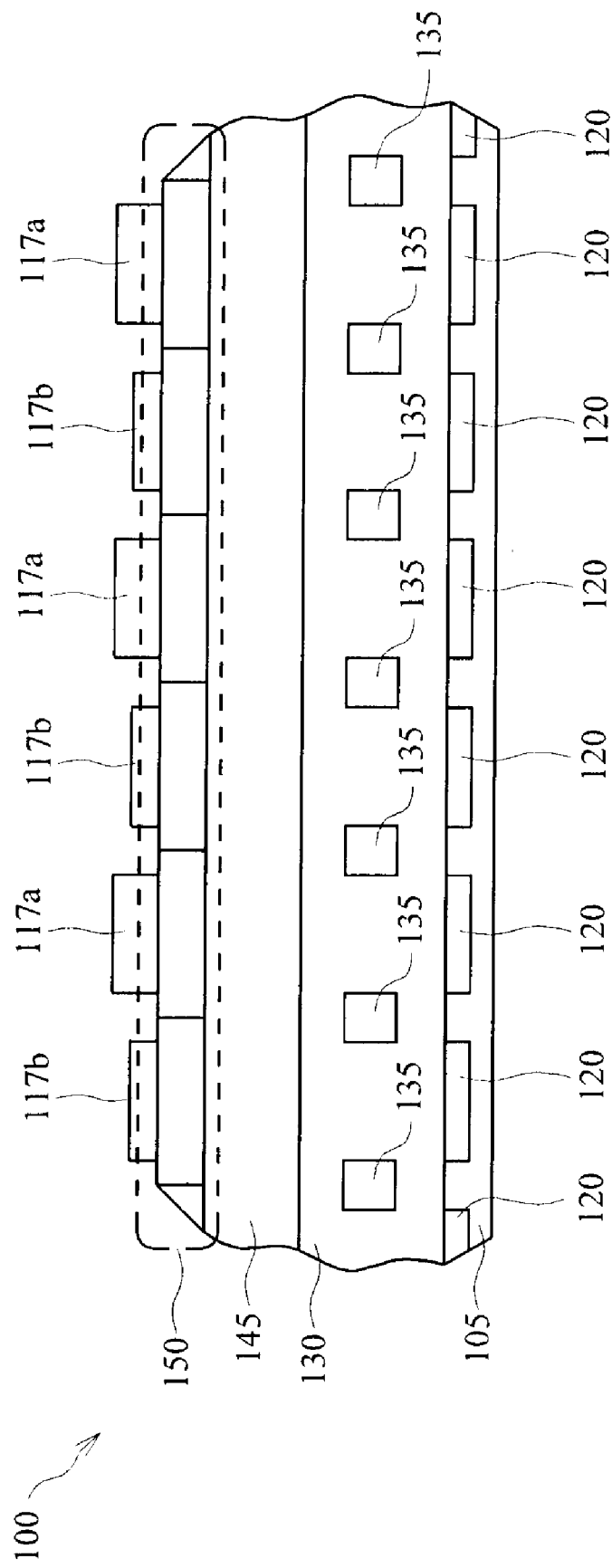
FIG. 8 is a sectional view of the apparatus shown in FIG. 7 in a subsequent stage of manufacture according to one or more aspects of the present disclosure.

Referring to FIG. 8, illustrated is a sectional view of the apparatus 100 shown in FIG. 7 in a subsequent stage of manufacture according to one or more aspects of the present disclosure, in which the patterned photoresist elements 172 are removed, possibly in a manner substantially similar to the previously removal of the photoresist elements 170. Thereafter, the double-exposed microlens material 115 is developed. As a result, as shown in FIG. 8, the portions of the microlens material 115 that were protected by the photoresist elements 172 during the second exposure step have formed discrete microlens material elements 117a, while the portions of the microlens material 115 that were not protected by the photoresist elements 172 during the second exposure step have formed discrete microlens material elements 117b. The microlens material elements 117a and 117b are each substantially aligned over a corresponding, where the microlens material elements 117a are substantially greater in thickness relative to the microlens material elements 117b. The thickness of the microlens material elements 117b may be about 50% of the thickness of the microlens material elements 117a, although this value may range between about 20% and about 80% within the scope of the present disclosure.

Figure 9:
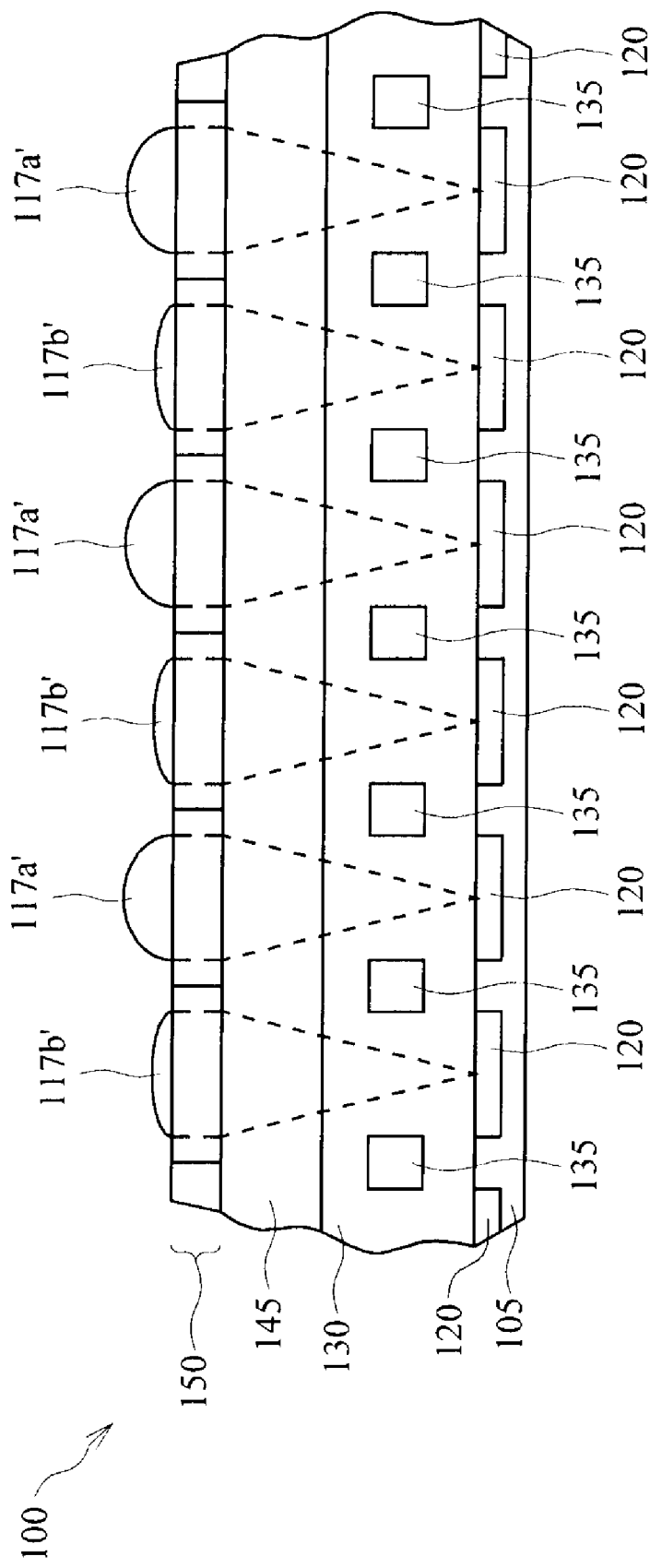
FIG. 9 is a sectional view of the apparatus shown in FIG. 8 in a subsequent stage of manufacture according to one or more aspects of the present disclosure.

Referring to FIG. 9, illustrated is a sectional view of the apparatus 100 shown in FIG. 8 in a subsequent stage of manufacture according to one or more aspects of the present disclosure, in which the microlens elements 117a and 117b have undergone one or more reflow and/or other heating processes, thereby forming a microlens array 115' comprising microlens cells 117a' and 117b'. The microlens cells 117a' and 117b' may be substantially similar to the microlens cells 17 of the microlens array 15 shown in FIGS. 1 and 2. However, the microlens cells 117a' and 117b' vary in thickness. Thus, each microlens 117b' may be about half as thick as each microlens 117a', although other arrangements also are within the scope of the present disclosure. Moreover, as indicated by the dash lines in FIG. 9, the focal lengths of each microlens 117a' and 117b' has been tailored such that the focal points of each microlens 117a' and 117b' substantially coincides with its corresponding photo-sensor 120, despite the fact that the light passing through each of element of the color filter array 150 may substantially vary.

Figure 10:
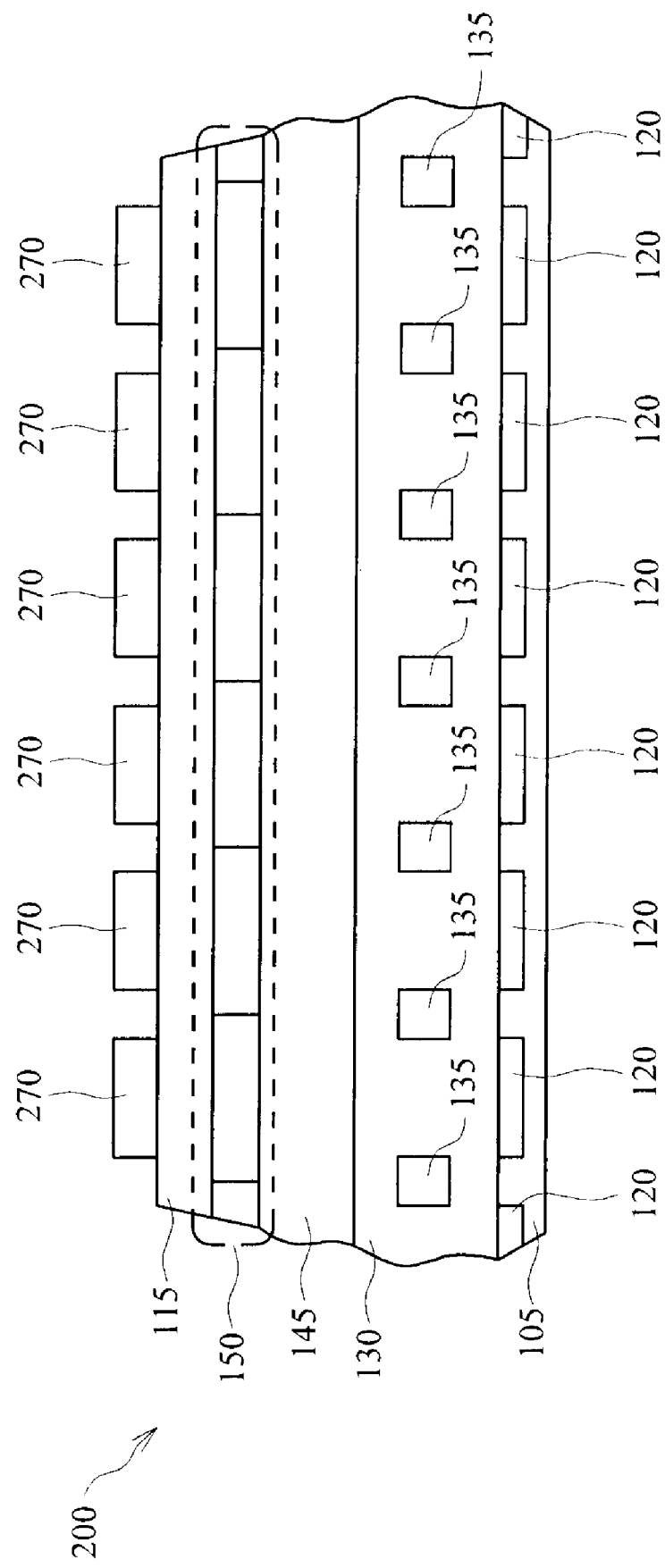
FIG. 10 is a sectional view of the apparatus shown in FIG. 4 in a subsequent stage of manufacture according to one or more aspects of the present disclosure.

Referring to FIG. 10, illustrated is a sectional view of another embodiment of the apparatus 100 shown in FIG. 5, herein designated by reference numeral 200. The manufacturing stage depicted in FIG. 10 is substantially the same as the manufacturing stage depicted in FIG. 5, except as provided below.

That is, in the embodiment illustrated in FIG. 10, patterned photoresist elements 270 have been formed over the microlens material layer 115. The photoresist elements 270 are substantially similar in composition and manufacture to the photoresist elements 170 of FIG. 5. However, the photoresist elements 270 are not all identical in shape, as described below.

Figure 11:
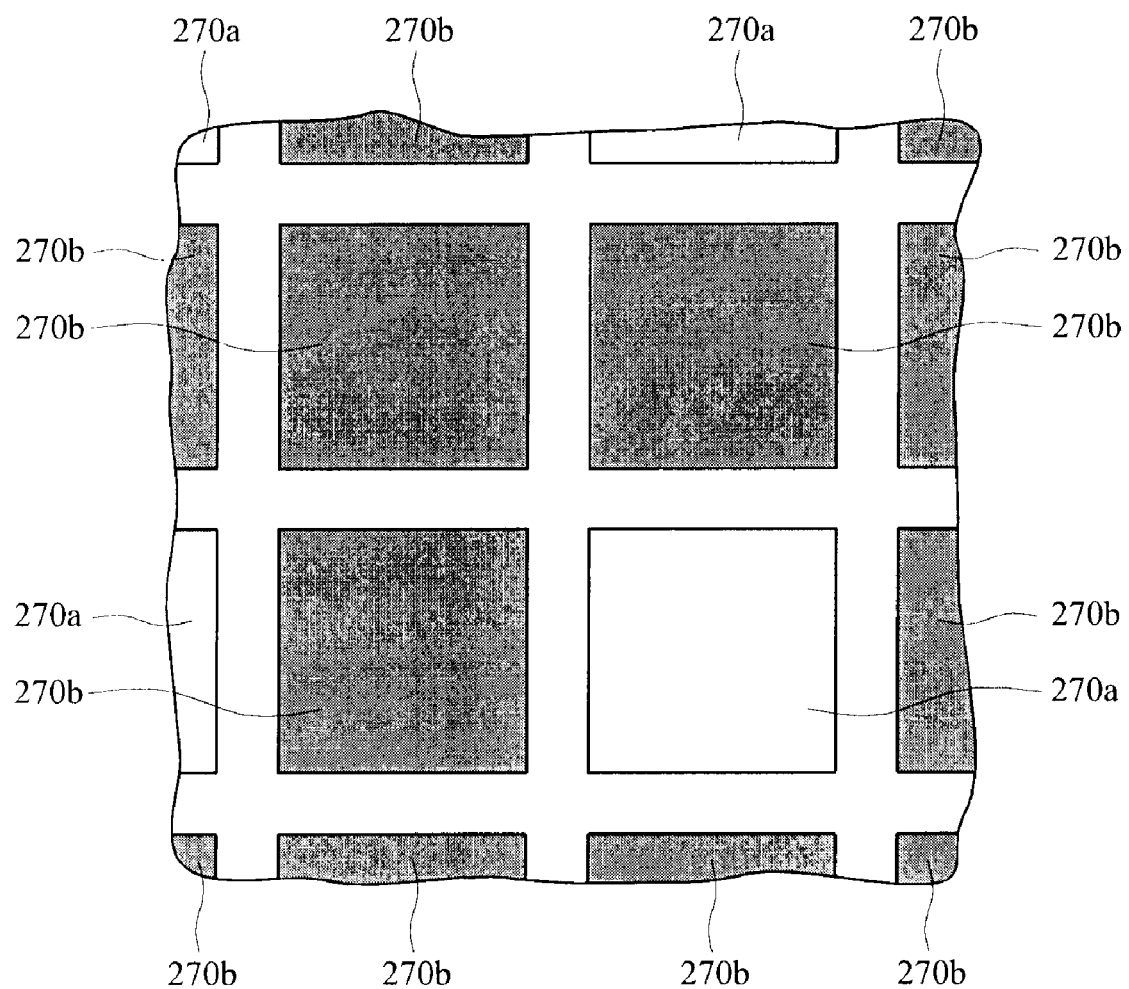
FIG. 11 is a top view of at least a portion of an embodiment of apparatus according to one or more aspects of the present disclosure.

FIG. 11 is a top view of at least a portion of the apparatus 200 shown in FIG. 10. Referring to FIGS. 10 and 11, collectively, some photoresist elements 270a have a larger footprint relative to the other photoresist elements 270b. All of the photoresist elements 270a and 270b may still have a substantially square-shaped footprint, although other shapes are also within the scope of the present disclosure. The lateral dimensions $d_4$ and $d_5$ of the photoresist elements 270a may be about 20% larger than the lateral dimensions $d_1$ and $d_2$ of the photoresist elements 270b, although this difference may also range between about 5% and about 50% within the scope of the present disclosure. However, the lateral pitch of the photoresist elements 270a and 270b may remain substantially constant despite the larger size of the photoresist elements 270a, such that the lateral offset $d_6$ of each photoresist element 270a from each neighboring photoresist element 270b may be about 30% to 40% less than the lateral offset $d_3$ between two neighboring photoresist elements 270b.

The photoresist elements 270a correspond to those pixels requiring a lens having a longer focal length, such as the photoresist elements 170 of FIG. 5 that were not replaced by photoresist elements 172 of FIG. 7. For example, the photoresist elements 270a may correspond to the blue pixels in a Red-Green-Blue pixilation scheme, whereas the photoresist elements 270b may correspond to the red and green pixels. The photoresist elements 270a are also semi-translucent to the photolithography energy subsequently employed to transfer the pattern of the photoresist elements 270a and 270b to the microlens material layer 115. The photoresist elements 270b may also be semi-translucent, although not to the same extent as the photoresist elements 270a.

As a result, the portions of the microlens material 115 which lay substantially under the photoresist elements 270a will be partially exposed during the photolithographic exposure step. That is, an upper portion will be exposed, while a lower portion will not be exposed. Consequently, the microlens elements 117a and 117b shown in FIG. 8 can then be defined from the microlens material 115 via a photolithography development step. Thereafter, one or more reflow and/or other heating processes may be employed to form the microlens cells 117a' and 117b' shown in FIG. 9.

Thus, according to one or more aspects of the present disclosure, a microlens array may be formed via conventional materials and processes over a color filter array and photosensor array that are also formed via conventional materials and processes, yet the microlens array may also include lenses of different focal lengths to compensate for the variation of refraction associated with the different wavelengths of light propagating from the color filter array towards the photo-sensor array. Consequently, the amount of color-filtered light that is incident upon each photo-sensor array may be substantially similar or equal.

These and/or other possible advantages may be achieved via aspects of one or more embodiments of methods employed in the manufacture of microlens devices within the scope of the present disclosure. One such method 300 is at least partially depicted in FIG. 12 as a flow-chart diagram.

The method 300 includes forming a microlens material over a color filter array and a photo-sensor array in step 310. A first photoresist layer is then formed over the microlens material in step 320. The first photoresist layer is then patterned in step 330 to form first photoresist elements that substantially correspond in shape, location and orientation to the individual optical elements of the microlens array being formed. The first photoresist elements are then employed in step 340 to initially expose portions of the microlens material that lie outside the perimeter boundaries of each optical element of the microlens array being formed.

The first photoresist elements are then stripped away in step 350, and a second photoresist layer is formed over the partially exposed microlens material in step 360. The second photoresist layer is then patterned in step 370 to form second photoresist elements that substantially correspond in shape, location and orientation to the individual optical elements of the microlens array that will correspond to the red and green pixels, or to the pixels that have sufficient focal length when manufactured conventionally. The second photoresist elements are then employed in step 380 to additionally expose portions of the microlens material that lie within the perimeter boundaries of those optical elements of the microlens array that require longer focal lengths, such as blue pixels.

The second photoresist elements are then stripped away in step 390, and the twice-exposed microlens material layer is developed in step 400, thereby defining discrete microlens material elements of different heights corresponding to the wavelength to which each color filter element is configured to transmit. The discrete microlens material elements of different heights then undergo a reflow process in step 410, which defines the convex, lens-shaped surface of each microlens. As a result, an increased focal length is achieved for each optical element of the microlens array that corresponds to a pixel which would otherwise suffer from lowered sensitivity due to shorter wavelength.

Figure 12:
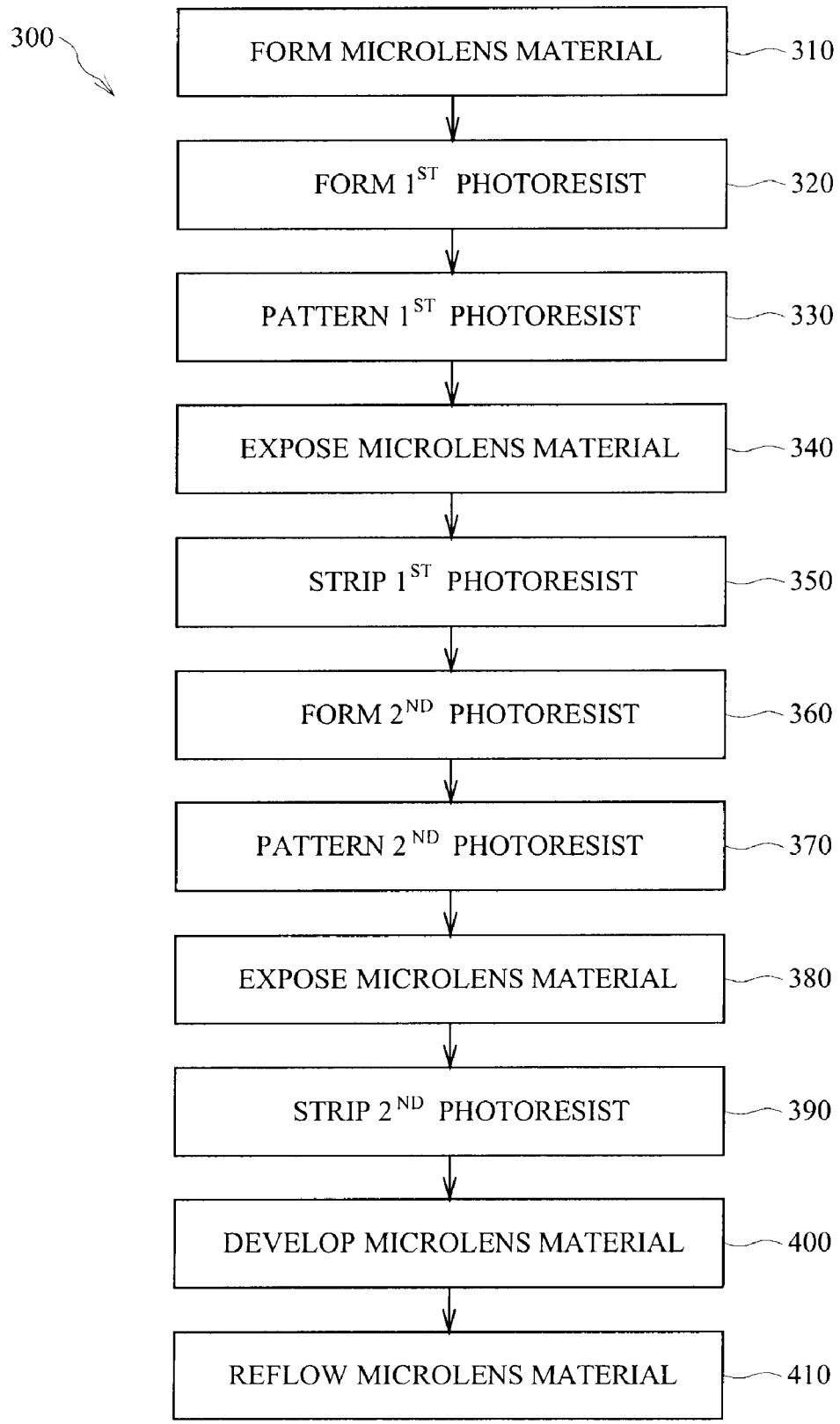
FIG. 12 is a flow-chart diagram of at least a portion of one embodiment of a method according to aspects of the present disclosure.
Figure 13:
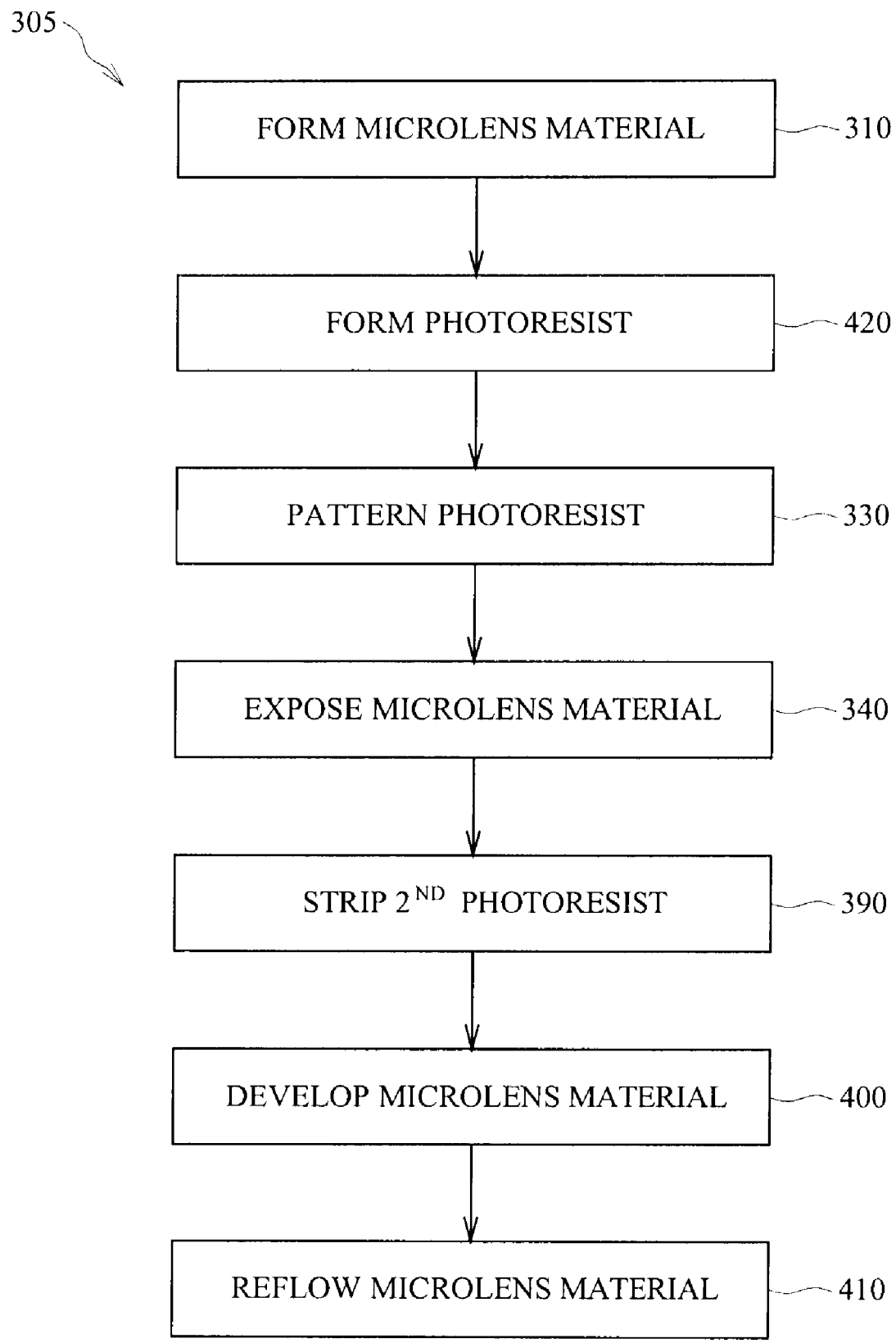
FIG. 13 is a flow-chart diagram of at least a portion of another embodiment of a method according to aspects of the present disclosure.

Referring to FIG. 13, illustrated is a flow-chart diagram of at least a portion of another embodiment of the method 300 shown in FIG. 12, and designated herein by reference numeral 305. The method 305 includes forming a microlens material over a color filter array and a photo-sensor array in step 310. A photoresist layer is then formed over the microlens material in step 420. After subsequent patterning in step 330, the photoresist layer includes first and second photoresist elements that each substantially correspond in shape, location and orientation to an individual optical element of the microlens array. The first photoresist elements each correspond to pixels that have sufficient focal length when manufactured conventionally (e.g., red and green pixels in a Red-Green-Blue scenario), while the second photoresist elements each correspond to pixels that have insufficient focal length when manufactured conventionally (blue pixels in a Red-Green-Blue scenario). The second photoresist elements have greater translucency to photolihtogaphic exposure energy, relative to the first photoresist elements. For example, the first photoresist elements may be substantially opaque, while the second photoresist elements may be semi-translucent (e.g., half-way between translucent and opaque).

The first and second photoresist elements are then employed in step 340 to expose portions of the microlens material. The portions of the microlens material that were protected by the first photoresist elements are protected from the exposure energy, at least to a greater extent than the degree to which the portions of the microlens material that were partially protected from the exposure energy by the at least partially translucent second photoresist elements.

The first and second photoresist elements are then stripped away in step 390, and the exposed microlens material layer is developed in step 400, thereby defining discrete microlens material elements of different heights corresponding to the wavelength to which each color filter element is configured to transmit. The discrete microlens material elements of different heights then undergo a reflow process in step 410, which defines the convex, lens-shaped surface of each microlens. As with the method 300, an increased focal length is achieved for each optical element of the microlens array that corresponds to a pixel which would otherwise suffer from lowered sensitivity due to shorter wavelength.

In view of the above, the present disclosure introduces a method of manufacturing a microlens device that includes, at least in one embodiment, depositing a microlens material layer over a substrate, wherein the substrate includes photo-sensors located therein. Portions of the microlens material layer are then exposed and developed to define microlens material elements. The microlens material elements include first microlens material elements and second microlens material elements, wherein each of the second microlens material elements are substantially greater in thickness relative to each of the first microlens material elements. The microlens material elements are then heated to form a microlens array. The microlens array includes first microlens array elements each corresponding to one of the first microlens material elements, and also includes second microlens array elements each corresponding to one the second microlens material elements, wherein each of the second microlens array elements is substantially greater in thickness relative to each of the first microlens array elements.

In one embodiment, the microlens device manufacturing method includes depositing the microlens material layer over the substrate, exposing and developing portions of the microlens material layer to define first and second microlens material elements, and heating the microlens material elements to form a microlens array that includes first and second microlens array elements, wherein each of the first microlens array elements has a substantially greater focal length relative to each of the second microlens array elements.

The present disclosure also introduces a microlens device that includes, at least in one embodiment, photo-sensors located in a substrate, a color filter array, and at least one optically transparent layer located between the color filter array and the photo-sensors. A microlens array is located over the color filter array. The microlens array includes first microlens array elements each having a first focal length and second microlens array elements each having a second focal length, wherein the first and second focal lengths are substantially different.

The foregoing has outlined features of several embodiments so that those skilled in the art may better understand the various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A microlens device, comprising:
   a plurality of photo-sensors located in a substrate;
   a color filter array;
   at least one optically transparent layer located between the color filter array and the plurality of photo-sensors; and
   a microlens array located over the color filter array and including:
      a plurality of first microlens array elements each having a first focal length, and
      a plurality of second microlens array elements each having a second focal length,
      wherein the first and second focal lengths are substantially different and wherein a thickness of each of the plurality of second microlens array elements is substantially less than a thickness of one of the plurality of first microlens array elements.

2. The microlens device of claim 1 wherein the microlens array has a Composition that at least partially includes a polymer material.

3. The microlens device of claim 1 wherein the color filter array includes:
   a plurality of first filter elements each configured to transmit light of a first wavelength, and a plurality of second filter elements each configured to transmit light of a second wavelength that is substantially different than the first wavelength.

4. The microlens device of claim 3 wherein the color filter array further includes a plurality of third filter elements each configured to transmit light of a third wavelength that is substantially different than the second wavelength.

5. The microlens device of claim 4 wherein the first wavelength is that of red light, the second wavelength is that of blue light, and the third wavelength is that of green light.

6. The microlens device of claim 1 wherein the thickness of each of the plurality of second microlens array elements is about 20% to 80% of the thickness of one of the plurality of first microlens array elements.

7. The microlens device of claim 6 wherein the thickness of each of the plurality of second microlens array elements is about 50% of the thickness of one of the plurality of first microlens array elements.

8. A microlens device, comprising:
a plurality of photo-sensors located in a substrate;
a color filter array;
at least one optically transparent layer located between the color filter array and the plurality of photo-sensors; and
a microlens array located over the color filter array and including:
a plurality of first microlens array elements each having a first focal length, and
a plurality of second microlens array elements each having a second focal length,
wherein the first and second focal lengths are substantially different;
wherein: the color filter array includes a plurality of first filter elements that are each configured to transmit light of a first wavelength, and that are each optically aligned with a corresponding one of the plurality of first microlens array elements,
the color filter array further includes a plurality of second filter elements that are each configured to transmit light of a second wavelength, and that are each optically aligned with a corresponding one of the plurality of second microlens array elements,
the second wavelength is substantially less than the first wavelength, and
the second focal length is greater than the first focal length.

9. The microlens device of claim 8 wherein:
the color filter array includes a plurality of third filter elements that are each configured to transmit light of a third wavelength, and that are each optically aligned with a corresponding one of the plurality of first microlens array elements, and
the second wavelength is substantially less than the third wavelength.

10. A microlens device, comprising:
a plurality of photo-sensors located in a substrate;
a color filter array;
at least one optically transparent layer located between the color filter array and the plurality of photo-sensors; and
a microlens array located over the color filter array and including:
a plurality of first microlens array elements each having a first focal length, and
a plurality of second microlens array elements each having a second focal length,
wherein the first and second focal lengths are substantially different;
wherein: the color filter array includes a plurality of red-light filter elements each optically aligned with a corresponding one of the plurality of first microlens array elements,
the color filter array further includes a plurality of green-light filter elements each optically aligned with a corresponding one of the plurality of first microlens array elements,
the color filter array further includes a plurality of blue-light filter elements each optically aligned with a corresponding one of the plurality of second microlens array elements, and
the second focal length is greater than the first focal length.

* * * * *